April 4, 1961  L. J. GARVEY  2,978,131
BOTTLE STRUCTURE
Filed Nov. 14, 1958

INVENTOR.
LEO J. GARVEY
BY
Willard S. Groene
ATTORNEY.

2,978,131

BOTTLE STRUCTURE

Leo Joseph Garvey, 301 W. Pasadena Ave., Phoenix, Ariz.

Filed Nov. 14, 1958, Ser. No. 773,932

2 Claims. (Cl. 215—1)

This invention pertains to improvements in bottle structures and is particularly directed to an improved arrangement to facilitate the handling and pouring of a bottle.

One of the objects of this invention is to provide an improved bottle structure in which the handle functions both to assist in the manipulation and pouring of the bottle and also to provide an air passageway to eliminate the gurgling and burbling of the bottle as it is poured.

Still another object of this invention is to provide a bottle structure having a handle for manipulating the pouring of the bottle which is hollow to provide an air passageway from the discharge mouth of the bottle to the bottom thereof to allow air to escape freely into the bottle without effecting the pouring of the contents therefrom.

Further features and advantages of this invention will appear from a detailed description of the drawings in which.

Figure 1:
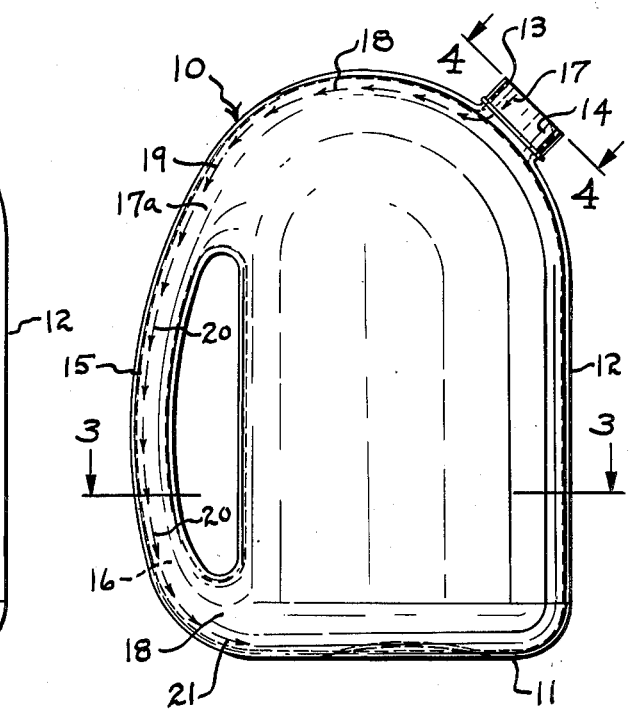
Fig. 1 is a side elevation of a bottle structure incorporating the features of this invention.
Figure 2:
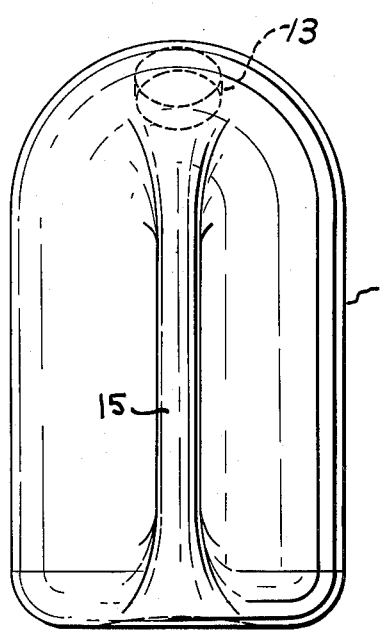
Fig. 2 is a rear end elevation of the bottle shown in Fig. 1.
Figure 3:
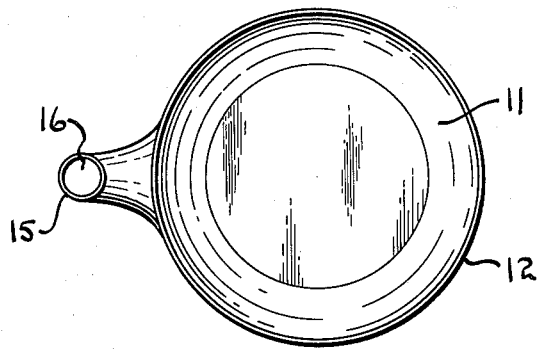
Fig. 3 is a horizontal section on the line 3—3 of Fig. 1.
Figure 4:
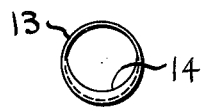
Fig. 4 is a view on the line 4—4 of Fig. 1.

As an example of one embodiment of this invention there is shown a bottle 10 having a bottom 11, the upstanding cylindrical side portion 12 and the discharge stem 13 having preferably a non-drip pouring lip 14.

At the rear of the bottle is provided the gripping handle 15 which has a hollow passageway 16 through it which opens at its upper portion in the area 17a and opens at its lower portion in the area 18 of the contents containing chamber formed by the cylindrical side portion 12 and the bottom 11 of the bottle. By means of this novel arrangement, when the bottle is tipped by gripping the handle 15 to pour the contents from the discharge stem 13 thereof air flows in the direction indicated by the arrows 17, 18 and 19 into the area 17 at the open upper end of the handle 15 and then proceeds as indicated by the arrows 20 through the hollow handle passageway 16 and then out through the area 18 as indicated by the arrows 21 so as to relieve the vacuum above the contents in the bottle and allow it to flow freely out through the discharge stem 13 thereof.

There has thus been provided a pouring bottle structure in which the manipulating handle 15 also provides through its hollow passageway therein an air passageway to prevent vacuum and burbling of the contents as it is poured out through the discharge stem of the bottle.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed and desired to be obtained by United States Letters Patent is:

1. A totally enclosed bottle structure having a contents containing chamber comprising, a bottom, an upstanding side portion integral with said bottom portion, and a top formed integral with the top of said upstanding side portion, a discharge stem in said top located at the upper end of said side portion opening through said top at a point below the highest portion of said contents containing chamber, a gripping handle formed integral with said side portion at a diametrically opposite position on said upstanding side portion from said stem having a hollow passageway formed therein including an upper terminal outlet for said passageway located inside the top of said bottle and below said discharge stem and a lower terminal outlet at the bottom thereof so that trapped air inside of said top of said chamber may flow through said upper passageway in said handle to the bottom of said bottle as the contents is poured from said stem.

2. In a bottle structure as set forth in claim 1 wherein the pouring lip of said stem is located below the highest portion of said contents containing chamber of the top of said bottle.

References Cited in the file of this patent

UNITED STATES PATENTS

| | | |
|---|---|---|
| D. 34,895 | McFaddin | Aug. 6, 1901 |
| 591,735 | Brewer | Oct. 12, 1897 |
| 649,394 | Bonnette et al. | May 8, 1900 |
| 819,191 | Weeks | May 1, 1906 |
| 2,135,239 | Patterson | Nov. 1, 1938 |

FOREIGN PATENTS

| | | |
|---|---|---|
| 9,438 | Great Britain | 1889 |